United States Patent
Hertling

(12) 
(10) Patent No.: US 6,874,034 B1
(45) Date of Patent: *Mar. 29, 2005

(54) INTELLIGENT PEER HYBRID PRINTING PROTOCOL

(75) Inventor: William Hertling, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 808 days.

This patent is subject to a terminal disclaimer.

(21) Appl. No.: 09/640,856

(22) Filed: Aug. 17, 2000

(51) Int. Cl.[7] .............................................. G06F 15/16
(52) U.S. Cl. ..................... 709/245; 709/201; 709/202; 709/203; 709/217; 709/225
(58) Field of Search ................................ 709/201, 202, 709/203, 217, 225, 245, 205, 223; 710/104; 358/1.13–1.16, 296

(56) References Cited

U.S. PATENT DOCUMENTS

| | | | |
|---|---|---|---|
| 5,327,526 A | * | 7/1994 | Nomura et al. ............. 358/1.16 |
| 5,467,434 A | * | 11/1995 | Hower et al. ............... 358/1.15 |
| 5,517,316 A | * | 5/1996 | Hube ......................... 358/296 |
| 5,745,747 A | | 4/1998 | Chang et al. |
| 5,787,237 A | | 7/1998 | Reilly |
| 5,872,569 A | * | 2/1999 | Salgado et al. ............. 345/764 |
| 5,933,584 A | | 8/1999 | Maniwa |
| 6,246,487 B1 | * | 6/2001 | Kobayashi et al. ........ 358/1.13 |
| 6,373,585 B1 | * | 4/2002 | Mastie et al. .............. 358/1.15 |
| 6,401,150 B1 | * | 6/2002 | Reilly ......................... 710/104 |
| 6,498,656 B1 | * | 12/2002 | Mastie et al. .............. 358/1.15 |

FOREIGN PATENT DOCUMENTS

GB        2331387        5/1999

OTHER PUBLICATIONS

Hertling, William, U.S. Appl. No. 09/640,855, filed on Aug. 17, 2000 (Related Application Including claims amended on Apr. 8, 2004).

* cited by examiner

*Primary Examiner*—Nabil El-Hady

(57) ABSTRACT

A system and a method are provided for printing on a network. In one embodiment, broadly stated the method comprises the steps of: receiving a print job ticket from a client; and placing the print job ticket in a printing queue, the printing queue determined by information contained in the print job ticket.

14 Claims, 6 Drawing Sheets

INTELLIGENT PEER HYBRID PRINTING PROTOCOL

TECHNICAL FIELD

The present invention is generally related to the field of network printing and, more particularly, is related to a system and method for network printing using a peer hybrid printing protocol.

BACKGROUND OF THE INVENTION

In printing documents from client computers and other devices to network printers, various printing protocols are used. Three such typical printing protocols employed include client-server printing, server-side-rendering (SSR) client-server printing, and peer-to-peer printing. These protocols are used by the various devices on the network to cause the printing of a particular document from the client. Such devices may include, for example, one or more clients, a queue server, a print server, and a printer, etc.

To print a document using client-server printing, for example, an application in a client first makes graphical device interface (GDI) calls to the operating system in the client. The operating system then creates enhanced meta file data (EMF data) from the GDI calls that are handed to a printer driver. The printer driver then renders the EMF data into printer ready bits (PRB) that form a print job. The print job is applied to the operating system to be transmitted over the network to the queue server for printing.

The queue server then receives the print job and places it in a queue associated with a particular printer. When the printer is ready to receive the print job, the queue server transmits the print job over the network to the print server. The print server then applies the print job to the printer for printing. Unfortunately, the client-server approach requires the entire document to be transmitted on the network twice, thereby consuming a potentially large amount of network bandwidth. This approach also consumes a considerable amount of queue server processing resources to receive, parse, spool (i.e., write to disk) and transmit the entire print job.

In server-side-rendering, (SSR) client-server printing, an application in a client first makes GDI calls to the operating system in the client. The operating system then creates EMF data from the GDI calls. The EMF data is transmitted over the network to a queue server. In the queue server, the EMF data is placed in a queue for printing. When the document is to be printed, the corresponding EMF data is applied to a printer driver in the queue server that renders the EMF data into printer ready bits (PRB) that form a print job. When the printer is ready to receive the print job, the print job is applied to the operating system in the queue server to be transmitted over the network to the print server for printing. The print server then applies the print job to the printer for printing. Unfortunately, the SSR client-server approach also requires the entire document to be transmitted on the network twice, once as EMF data and once as printer ready bits. This results in the consumption of a potentially large amount of network bandwidth. In addition, the centralization of the printer driver on the queue server can stress the computing capacity of the queue server even beyond that found in client-server printing in order to effectively render the EMF data into printer ready bits (PRB). This is especially a concern given that a number of printer drivers may be placed on the queue server to service a number of printers.

In peer-to-peer printing, an application in a client first makes GDI calls to the operating system in the client. The operating system then creates EMF data from the GDI calls that are handed to a printer driver in the client. The printer driver then renders the EMF data into printer ready bits (PRB) that form a print job. The print job is applied to the operating system in the client to be transmitted over the network directly to the print server for printing.

When the print server is ready to receive data, the operating system in the client transmits the print job to the print server. The print server then applies the printjob to the printer for printing. Although, the peer-to-peer printing approach only requires the entire document to be transmitted on the network once, the peer-to-peer approach does not facilitate centralized printer control, queuing or prioritizing print jobs, tracking printer or job statistics, and the like.

SUMMARY OF THE INVENTION

In light of the foregoing, the present invention provides for a system and method for network printing of a document. In one embodiment, a queue server for controlling the printing of a document has a processor coupled to a local interface and a memory coupled to the local interface. The queue server also has a print queue logic stored in the memory and executable by the processor, the print queue logic including logic to place a print job ticket received from a client in a printing queue, the printing queue determined by information contained in the print job ticket.

In another embodiment, a queue server for controlling the printing of a document has a processor coupled to a local interface and a memory coupled to the local interface. The queue server also has a print job ticket processing logic stored in the memory and executable by the processor, the print job ticket processing logic including logic to parse a print job ticket received from a client and logic to update a statistical database with information contained in the print job ticket.

In yet another embodiment, a method in a queue server for printing a document has steps of receiving a print job ticket from a client and placing the print job ticket in a printing queue, the printing queue determined by information contained in the print job ticket.

Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
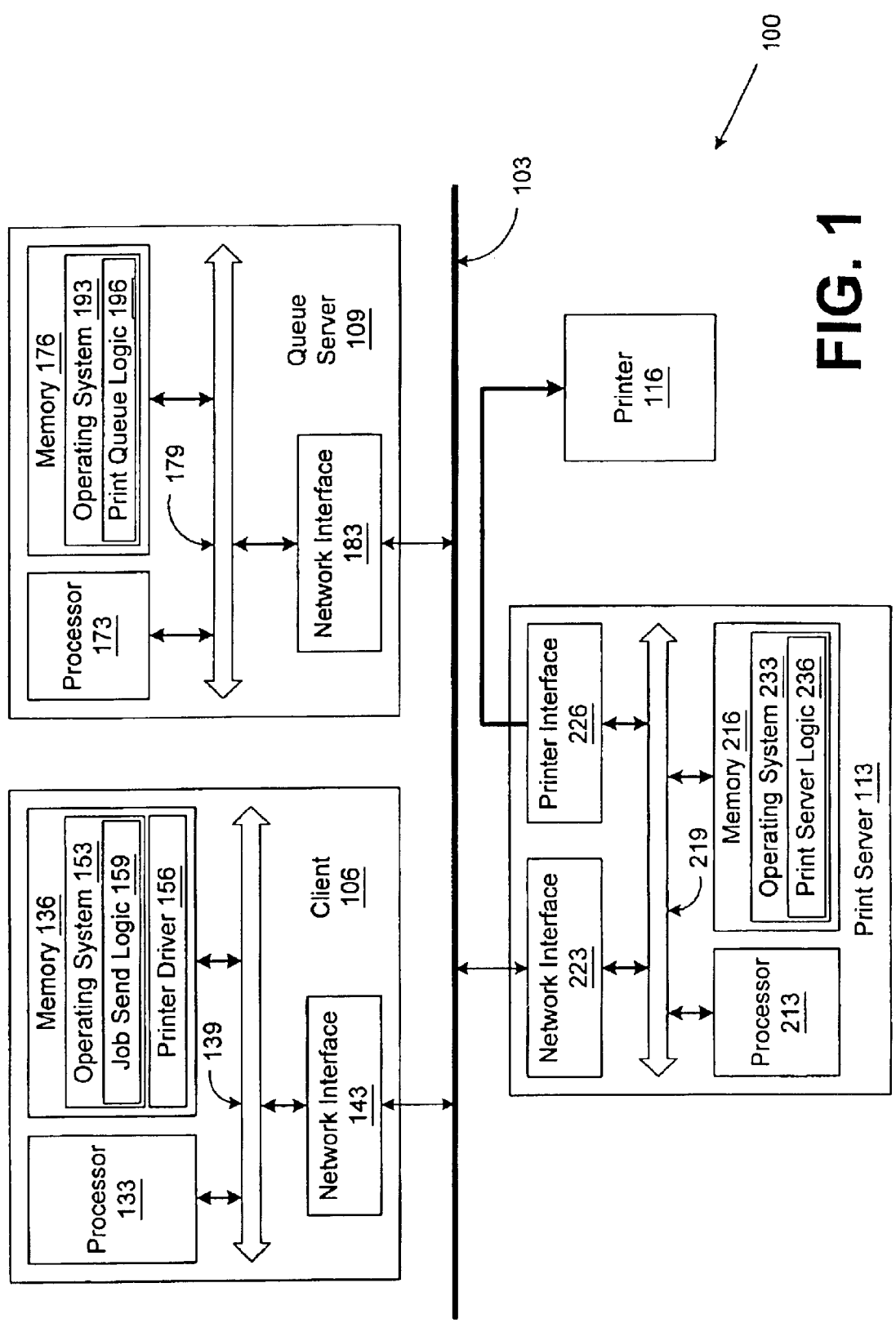
FIG. 1 is a block diagram of a network according to an embodiment of the present invention.

With reference to FIG. 1, shown is a printing network 100 according to an embodiment of the present invention. The printing network 100 includes a network 103 to which is coupled a client 106, a queue server 109, and a print server 113. A printer 116 is coupled to the print server 113 as shown.

The client 106 includes a processor circuit that includes a processor 133 and a memory 136, both of which are coupled to a local interface 139. The local interface 139 may be a data bus with an accompanying control bus as known by those with ordinary skill in the art. The client 106 further includes a network interface 143 that couples the local interface 139 to the network 103. Through the network interface 143, data may be transmitted from the local interface 139 to the network 103 to any other device on the printing network 100. Also, the network interface 143 makes data transmitted via the network 103 available on the local interface 139. Thus, the network interface 143 may be, for example, a network interface card, modem, or other interface that includes appropriate buffer circuitry and transmission circuitry, etc., to accomplish these tasks. In this respect, the network 103 may comprise a local area network, a wide area network, or the Internet, etc.

The client 106 also features an operating system 153 and a printer driver 156 stored in the memory 136 and executable by the processor 133. The operating system 153 is executed to control and/or perform the various functions of the client 106 in a similar manner to operating systems known by those with ordinary skill in the art. However, according to the present invention, the operating system 153 further includes job send logic 159 that is executed in order to interface with the queue server 109 and the print server 113 to print a document as will be discussed. Such a document (not shown) generally results from the operation of a particular application (not shown) on the client 106 as is generally known by those with ordinary skill in the art. The printer driver 156 is employed by the client device 106 to render enhanced meta file (EMF) data into printer ready bits (PRBs) as is known by those with ordinary skill in the art. The particular printer driver 156 that is used is compatible with the printer 116.

The queue server 109 includes a processor circuit that includes a processor 173 and a memory 176, both of which are coupled to a local interface 179. The local interface 179 may be a data bus with an accompanying control bus as known by those with ordinary skill in the art. The queue server 109 further includes a network interface 183 that couples the local interface 179 to the network 103. The network interface 183 is similar to the network interface 143 and is not described in great detail.

The queue server 109 further comprises an operating system 193 that is executed to control and/or perform the various functions of the queue server 109 in a similar manner to operating systems known by those with ordinary skill in the art. However, according to the present invention, the operating system 193 additionally includes print queue logic 196 that is executed to interface with the client 106 and the print server 113 in accomplishing the tasks of queuing and generally printing a document from the client 106 on the printer 116 as will be discussed.

The print server 113 includes a processor circuit that features a processor 213 and a memory 216, both of which are coupled to a local interface 219. The local interface 219 may be a data bus with an accompanying control bus as known by those with ordinary skill in the art. The print server 113 further includes a network interface 223 that couples the local interface 219 to the network 103. The network interface 223 is similar to the network interface 143 and is not described in great detail.

The print server 113 also includes a printer interface 226 that may be a printer interface card that couples the printer 116 to the local interface 219. In this regard, the printer interface 226 may comprise an appropriate printer card, etc., as known by those with ordinary skill in the art.

The print server 113 further comprises an operating system 233 that is executed to control and/or perform the various functions of the print server 113 in a similar manner to operating systems known by those skilled in the art. However, according to the present invention, the operating system 233 additionally includes print server logic 236. The print server logic 236 is executed to interface with the client 106 and the queue server 109 in accomplishing the tasks of queuing and generally printing a document from the client 106 on the printer 116 as will be discussed.

Additionally, the memories 136, 176, and 216 may include both volatile and nonvolatile memory components. Volatile components are those that do not retain data values upon loss of power. Conversely, nonvolatile components retain data upon a loss of power. Thus, the memories 136, 176, and 216 may comprise, for example, random access memory (RAM), read-only memory (ROM), hard disk drives, floppy disks accessed via an associated floppy disk drive, compact disks accessed via a compact disk drive, magnetic tapes accessed via an appropriate tape drive, and/or other memory components, or a combination of any two or more of these memory components.

Also, each of the processors 133, 173, 213 may represent multiple processors operating in parallel and each of the memories 136, 176, 216 may represent multiple memories. In such a case, each of the local interfaces 139, 179, 219 may be an appropriate network that facilitates communication between any two of the multiple processors or between any one processor and any one of the memories, etc. In addition, the processors 133, 173, 213, memories 136, 176, and 216, and local interfaces 139, 179, 219 may be electrical or optical in nature. The memories 136, 176, and 216 may also be magnetic in nature.

The client 106, the queue server 109, and the print server 113 may include appropriate input/output devices (not shown). In this regard, the input devices may include, for example, but are not limited to a keyboard, keypad, touch pad, touch screen, microphone, mouse, joystick, or one or more push buttons, etc. User output devices may include display devices, indicator lights, speakers, printers, etc. Such display devices may be, for example, cathode ray tubes (CRTs), liquid crystal display screens, gas plasma-based flat panel displays, indicator lights, light emitting diodes, and other display devices.

In addition, the queue server 109 and the print server 113 may also be combined into a single server that performs the functions of both, taking the operation requirements of both into account. That is to say, a combined queue and print server should have a fast enough operating speed to accomplish both functions simultaneously.

Figure 2:
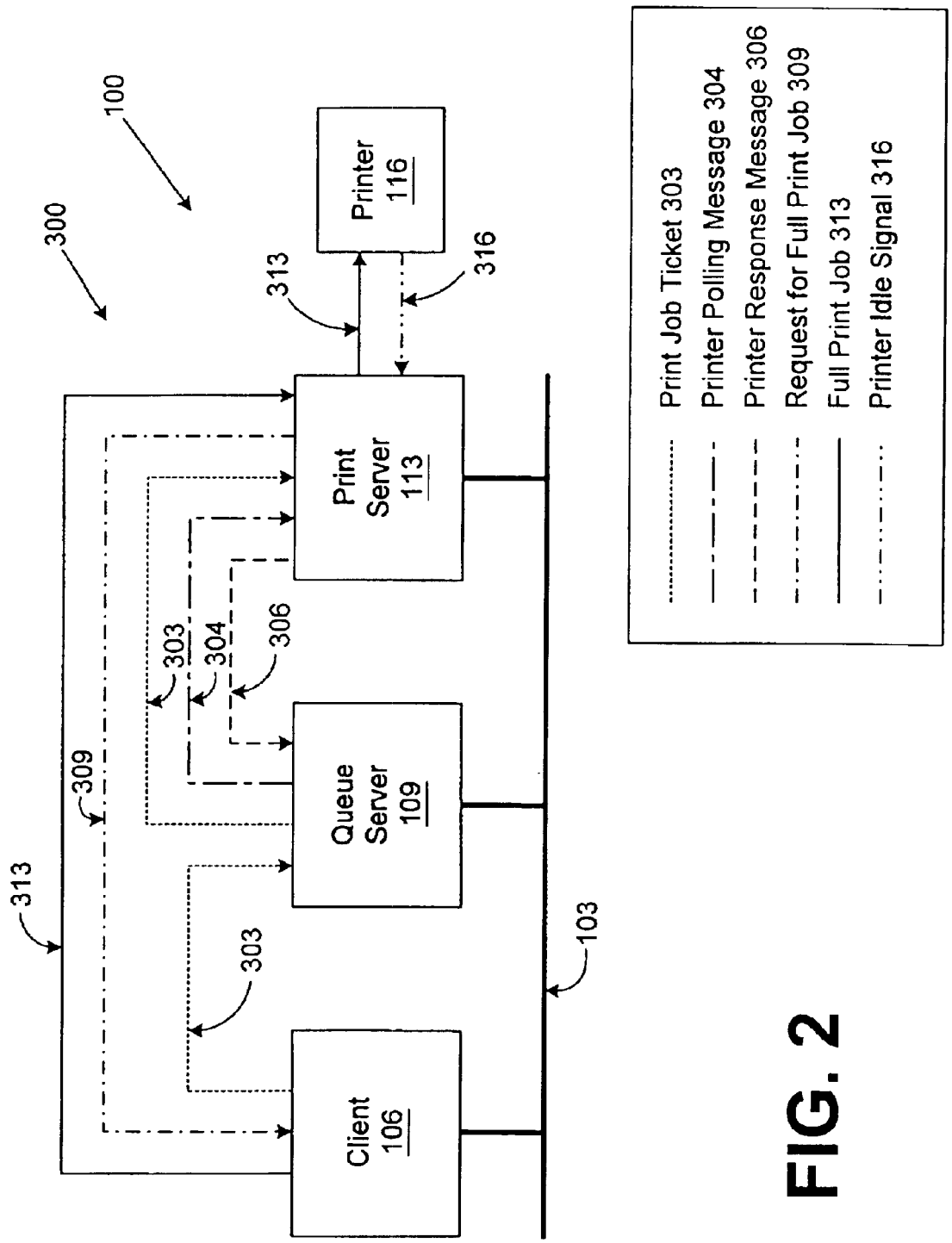
FIG. 2 is a block diagram that depicts a printing protocol implemented on the network of FIG. 1.

With to reference to FIG. 2, shown is a block diagram of the printing network 100 that depicts a printing protocol 300 according to an embodiment of the present invention. The printing protocol 300 provides for communication between the various devices of the printing network 100. In particular, the printing protocol 300 includes a print job ticket 303, a printer polling message 304, a printer response message 306, a request for full print job 309, a full print job 313, and a printer idle signal 316. Each of these data communications are employed as part of the printing protocol 300 to cause a document that resides in the client 106 to be printed on the printer 116.

Assuming that the client 106 includes an application that has generated a document to be printed on the printer 116, the client 106 makes appropriate graphical device interface (GDI) calls to the operating system 153 (FIG. 1). The operating system 153 makes corresponding enhanced meta file (EMF) data from the GDI calls, and hands the EMF data to the printer driver 156. The printer driver 156 renders the EMF data into printer ready bits (PRBs) and sends the resulting full print job to the operating system 153 in PRB format. The operating system 153 then spools the full print job to the memory 136.

The client 106 then generates a print job ticket 303 that includes the address of the client 106 on the network 103, the name or identification of the full print job, and any other pertinent information such as the number of pages to be printed, etc. The client 106 then transmits the print job ticket 303 to the queue server 109. The queue server 109 places the print job ticket 303 in a printing queue maintained in the queue server 109. The queue server 109 then transmits a printer polling message 304 to the print server 113 to determine if the printer 116 is available to print a document. The print server 113 responds with the printer response message 306 that informs the queue server 109 that the printer 116 is busy printing or is available. If the printer 116 is occupied with another print job, the queue server 109 waits for a period of time and then retransmits the printer polling message 304. If the printer 116 is available, the queue server 109 then transmits the print job ticket 303 to the print server 113.

Alternatively, rather than polling the print server 113 as to the printer availability, the queue server 109 may simply wait for a "printer available signal" from the print server 113 signifying that a previous print job sent to the printer 116 has finished. When the printer available signal is received, the queue server 109 is informed that the printer 116 is available for another print job.

Once the print server 113 receives the print job ticket 303, the print server 113 examines it to ascertain the client 106 that originated the print job ticket 303, assuming that there are a number of clients 106 on the network 103. The print server 113 then transmits a "request for full print job" 309 to the client 106 based upon the client network address.

In response, the client 106 transmits the full print job 313 to the print server 113. The full print job 313 includes the digital data that makes up the document to be printed in PRB format. Thereafter, the print server 113 transmits the full print job 313 to the printer 116 that prints the document, accordingly. Once the printer 116 has finished printing the document, the printer 116 transmits the printer idle signal 316 back to the print server 113. The print server 113 then waits for another printer polling message 304 to begin the process again. Alternatively, if printer polling is not used by the queue server 109, the print server 113 transmits a "printer available signal" to the queue server 109 to inform the queue server 109 that the printer is ready for the next print job. The print server 113 maintains the availability status of the printer 116 based upon the fact that it sent a full print job 313 to the printer 116 and/or received the printer idle signal 316 from the printer 116.

Figure 3:
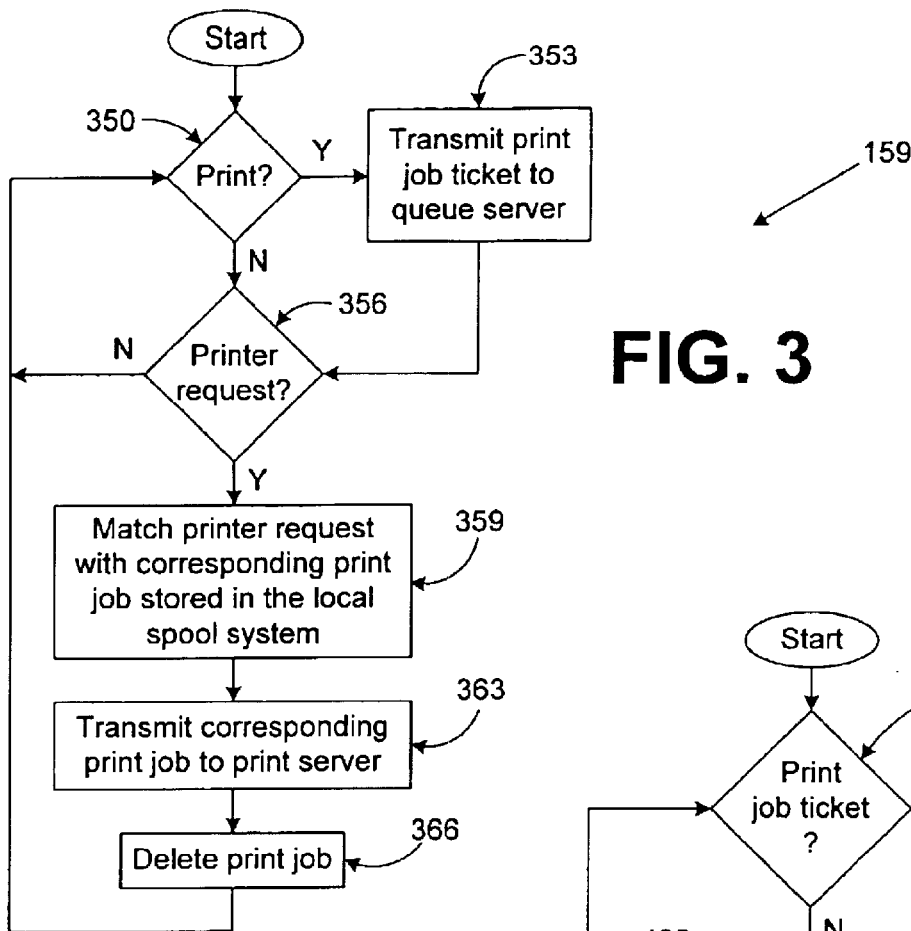
FIG. 3 is a flow chart of job send logic executed by a client in the network of FIG. 1 to implement the printing protocol of FIG. 2.

With the foregoing in mind, reference is made to FIG. 3 that shows a flowchart of the job send logic 159 that is executed by the client 106 (FIG. 1). The job send logic 159 is executed by the processor 133 (FIG. 1) in order to fulfill the role or the client 106 in printing a document on the printer 116 (FIG. 1) according to the printing protocol 300 (FIG. 2). Beginning with block 350, the job send logic 159 determines whether a document is to be printed as mandated by the operating system 153 (FIG. 1). If such is the case then the job send logic 169 moves to block 353 in which the print job ticket 303 (FIG. 2) is generated and transmitted to the queue server 109 (FIG. 2). If there is no document to be printed in block 350, then the job send logic 159 moves to block 356 in which it is determined whether a request for full print job 309 (FIG. 2) has been received from the print server 113 (FIG. 2). Also, after the print job ticket 303 is transmitted to the queue server 109 in block 353, the job send logic 159 moves to block 356 as shown. Thus, the job send logic 159 will continually move between blocks 350 and 356 waiting for either a document to be printed or a printer request to be received from the print server 113.

If there is no request for full print job 309 received from the print server 113 in block 356, then the job send logic 159 reverts back to block 350 as shown. On the other hand, if a request for full print job 309 is received by the client 106 in block 356, then the job send logic 159 moves to block 359. In block 359 the request for full print job 309 is matched with the corresponding print job that is stored in the local spool system of the client 106. Thereafter, in block 363 the full print job 313 (FIG. 2) is transmitted to the print server 113 and in block 366 the full print job 313 is deleted in the client 106. Thereafter, the job send logic 159 reverts back to block 350.

Figure 4:
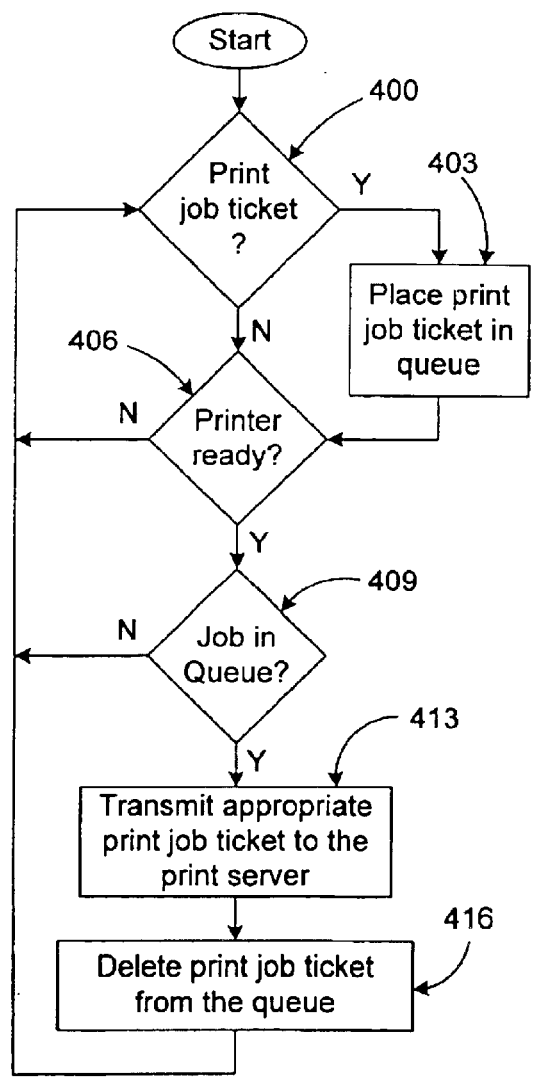
FIG. 4 is a flow chart of print queue logic executed by a queue server in the network of FIG. 1 to implement the printing protocol of FIG. 2.

With reference to FIG. 4, shown is a flowchart of the print queue logic 196 according to another embodiment of the present invention. The print queue logic 196 is executed by the processor 173 (FIG. 1) of the queue server 109 (FIG. 1) to perform the functions of the queue server 109 that relate to the printing protocol 300 (FIG. 2). Beginning with block 400, the queue server 109 determines whether it has received a print job ticket 303 (FIG. 2) from the client 106 (FIG. 2). If so, then the print queue logic 196 moves to block 403. If not, then the print queue logic 196 moves to block 406. Assuming that the print queue logic 196 has moved to block 403, the print job ticket 303 that is received from the client 106 is placed within a printing queue maintained in the queue server 109. The printing queue may be stored, for example, in the memory 176 (FIG. 1). The print queue logic 196 then moves to block 406. Upon reaching block 406, the print queue logic 196 determines whether the printer 116 (FIG. 1) is either idle or printing a document. This is determined, for example, by transmitting the printer polling message 304 (FIG. 2) to the print server 113 to receive the printer response message 306. The printer response message 306 indicates whether the printer 116 is available. Alternatively, the print queue logic 196 may simply wait to receive a printer available signal from the print server 113. If the printer 116 is idle and ready to print a document in block 406, then the print queue logic 196 moves to block 409. Otherwise, the print queue logic 196 reverts back to block 400.

In block 409 the print queue logic 196 determines whether there is a job in the queue that is to be printed. If so, then the print queue logic 196 proceeds to block 413. Otherwise, the print queue logic 196 reverts back to block 400. In block 413, the print queue logic 196 transmits the print job ticket 303 (FIG. 2) to the print server 113. Then, in block 416 the print job ticket 303 is deleted from the printing queue maintained within the queue server 109 as the job has been sent to the print server 113 for printing. Thereafter, the print queue logic 196 reverts back to block 400.

Figure 5:
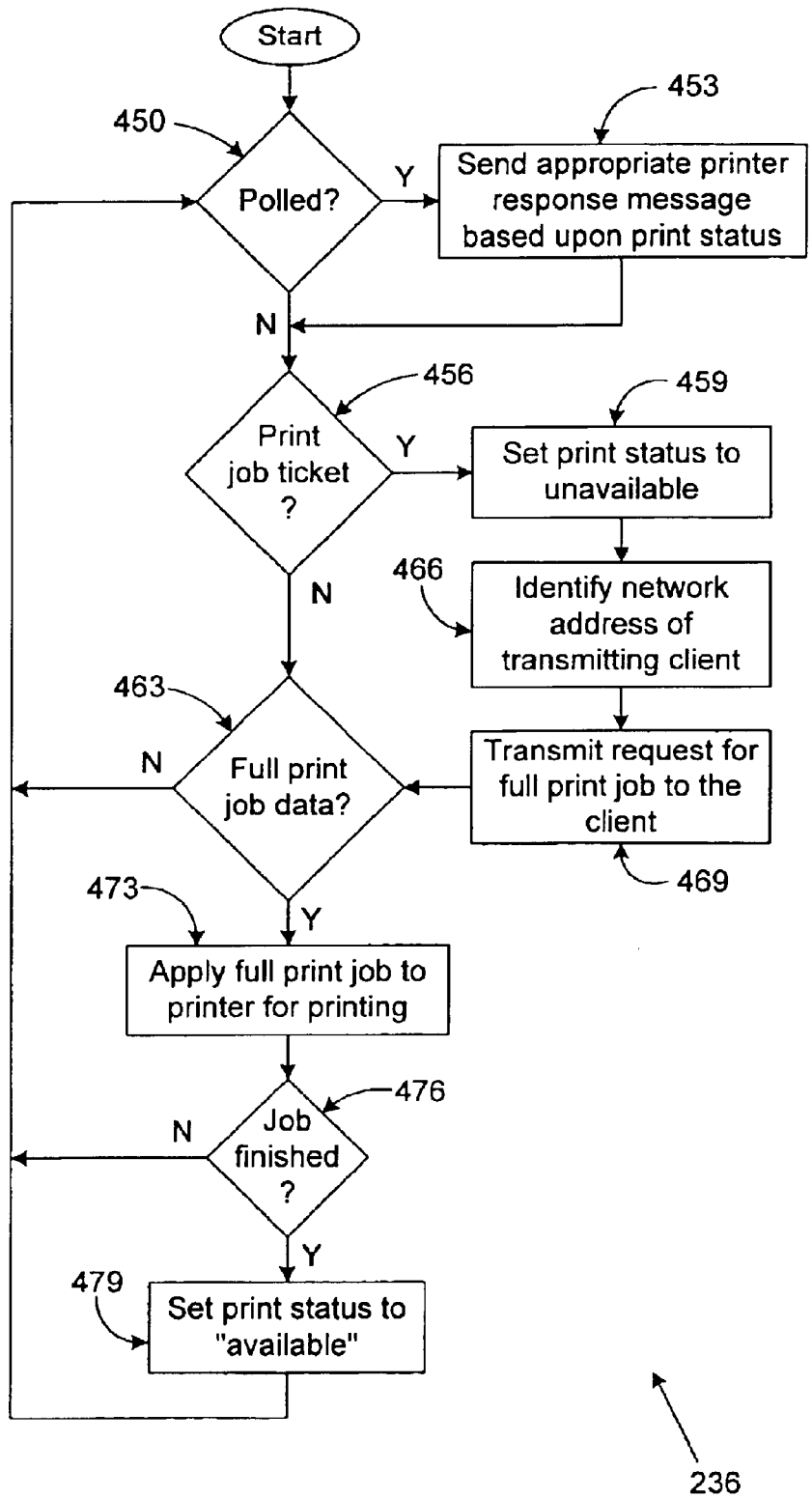
FIG. 5 is a flow chart of print server logic executed by a print server in the network of FIG. 1 to implement the printing protocol of FIG. 2.

With reference to FIG. 5, shown is a flowchart of the print server logic 236 that is executed by the processor 213 (FIG. 1) in the print server 113 (FIG. 1). The print server logic 236 is executed to perform the functions of the print server 113 that relate to the printing protocol 300 (FIG. 2). Beginning with block 450, the print server logic 236 determines if a printer polling message 304 (FIG. 2) has been received. If so, then the print server logic 236 moves to block 453. Otherwise, the print server logic 236 proceeds to block 456. In block 453 the print server logic 236 determines the print status of the print server 113 and the printer 116. When a print job is not being processed based on a previously received print job ticket 303, then the print status is available. Otherwise, the print status is unavailable. The actual print status may be determined in block 453, for example, by examining a bit in the memory 216 (FIG. 1) that maintains the print status. Specifically, the bit may be placed in a logical "0" state indicating an available status or in a logical "1" state indicating an unavailable status. Based on the print status, the print server logic 236 sends an appropriate printer response message 306 (FIG. 2) to the queue server that originally sent the printer polling message 304. Thereafter, the print server logic 236 proceeds to block 456.

In block 456, the print server logic 236 determines whether a print job ticket 303 has been received from the queue server 109. If so, then the print server logic 236 moves to block 459. If not, then the print server logic 236 proceeds to block 463. In block 459 the print server logic 236 sets the print status to "unavailable". This may be accomplished, for example, by setting the previously mentioned printer status bit to a logical "1". Thereafter, in block 466 the network address of the client 106 (FIG. 1) from which the print job ticket 303 originated is determined. Next, in block 469 the print server logic 236 transmits a request for full print job 309 to the client 106. The print server logic 236 then proceeds to block 463.

In block 463 the print server logic 236 determines whether data from a full print job 313 (FIG. 2) is available from the client 106. If so, then the print server logic 236 responds by moving to block 473. If not, the print server logic 236 reverts back to block 450 as shown. In block 473, the data from the full print job 313 is applied to the printer 116 for printing and the print server logic 236 then moves on to block 476 as shown.

In block 476 the print server logic 236 determines whether the full print job 313 has finished printing on the printer 116. If so, then the print server logic 236 proceeds to block 479. If not, then the print server logic 236 reverts back to block 450 as shown. In block 479 the print server logic 236 sets the print status to "available" by setting the status bit previously mentioned, for example, to a logic "0". Thereafter, the print server logic 236 reverts back to block 450.

Figure 6:
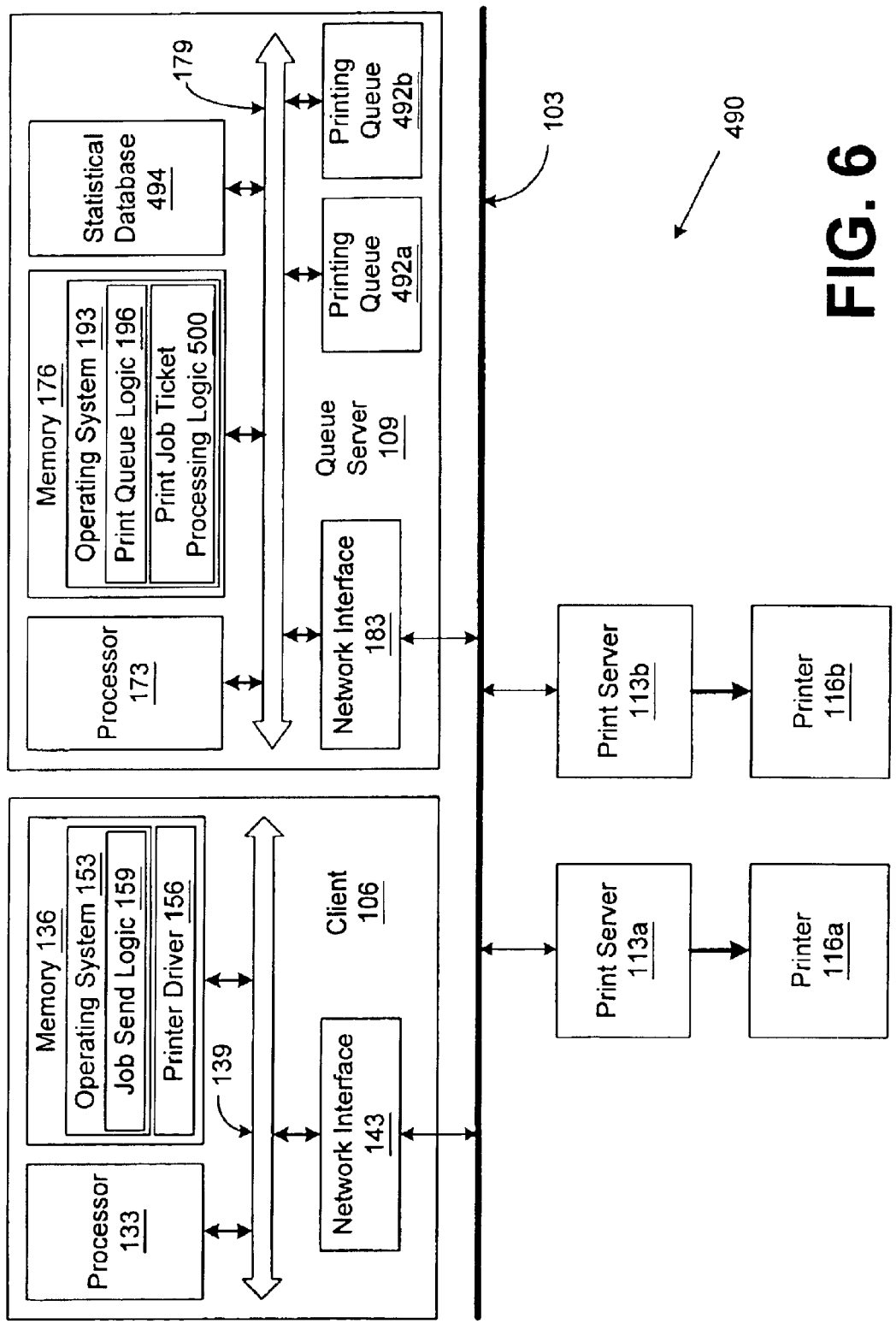
FIG. 6 is a block diagram of a network according to another embodiment of the present invention.

Referring now to FIG. 6, a printing network 490 is illustrated. The printing network 490 is substantially similar to the printing network 100 of FIG. 1 and uses the printing protocol and logic routines illustrated in FIGS. 2–5. Therefore, discussion of the common features between printing network 490 and printing network 100 will be omitted and the same reference numerals will be used for corresponding parts.

As in the printing network 100, the queue server 109 of printing network 490 has an operating system 193. The operating system 193 includes the print queue logic 196 and additionally includes a print job ticket processing logic 500. As will be discussed in greater detail below, the print job ticket processing logic 500 assists the queue server 109 in carrying out the print queue logic 196 and enables the queue server 109 to have enhanced functionality.

Briefly referring to FIGS. 2, 3 and 6, the job send logic 159 of the client 106 will generate and send a print job ticket 303 to the queue server 109 in block 353. As discussed above, the print job ticket 303 sent by the client 106 and received by the queue server 109 contains certain information related to the print job. As mentioned, this information can include the address of the client 106 on the network 103, the name or identification of the full print job, and any other pertinent information such as the number of pages to printed.

More specifically, the address of the client 106 can be a client IP address and client port number. The name or identification of the full print job can be a client job ID. The additional print job characteristics can include any number of information items related to either the client 106 or the print job. Example information items related to the client 106 include a user ID to identify the natural person using the client 106 and a group ID to identify which of a plurality of groups the client 106 is associated with. The groups can be logically arranged by criteria such as corporate departments or other organizational structure. Example information items related to the print job include destination printer, document size, document content information and billing information (e.g., a charge code). Document size can be measured in terms of pages, byte size or the like. Document content information can include designations as to whether the document, or a portion of the document, is in black and white, is in color, contains graphics or contains photographs to be printed on electronic photograph paper. The document content information can also identify paper size, such as various English sizes (e.g., letter or legal size), various envelope sizes or various metric sizes (e.g., A4).

Referring now to FIGS. 4 and 6, the print queue logic 196 will place a received print job ticket 303 within a printing queue 492 maintained by the queue server 109 (block 403). Each print server 113 and associated printer 116 has an associated printing queue 492. Associated printing queues 492, print servers 113 and printers 116 are identified in FIG. 6 with corresponding alphabetical letters. Each printing queue 492 may be contained within the memory 176 or contained in one or more separate memories resident in the queue server 109.

The print job ticket 303 is placed in one of the printing queues 492 in a manner consistent with information contained in the print job ticket 303. When placing a print job ticket 303 in the printing queue 492, two general issues are addressed by the print queue logic 196. The first issue relates to which printing queue 492a, 492b, etc, should receive the print job ticket 303. The second issue relates to prioritization within the print queue 492, or where in the printing queue 492 should the print job ticket 303 be placed relative to previously received print job tickets 303. Determinations of these issues are resolved using the application of default logic and/or criteria established by a printing network 490 administrator to the information contained in the print job ticket 303.

As an example, it is assumed that the printing network 490 is configured to allow the client 106 to direct a print job to a specified printer 116. In this case, the print job ticket 303 will contain information related to the destination printer 116 (such as a printer ID) and the print queue logic 196 will use this information to place the print job ticket 303 in the appropriate printing queue 492. Prioritization of the print job ticket 303 relative to previously received print job tickets 303 can be handled in a number of ways. For example, all print job tickets 303 can be processed on a first-in first-out (FIFO) basis. Alternatively, the print queue logic 196 can be programmed to place short jobs (e.g., under 10 pages) ahead of jobs of greater length (e.g., 100 or more pages). In another alternative, prioritization can be conducted based on the identity of the client 106, the user ID, the group ID, etc.

As another example, it is assumed that the printing network 490 is configured such that the queue server 109 directs which printer 116 is to receive a print job. This arrangement is known as virtual printing. In this arrangement, the client 106 transmits the print job ticket 303 to the queue sever 109. The print job ticket 303 specifies a virtual printer name or ID on the queue server 109 as the destination of the associated print job. Upon receiving the print job ticket 303, the print queue logic 196 will detect the virtual printer name or ID and determine a set of printing queues 492 associated with the specified virtual printer name or ID. The print queue logic 196 will then determine which print queue 492 from the associated set of printing queues 492, and hence which printer 116, to direct the print job ticket 303 based on information contained in the print job ticket 303.

The foregoing determination of which printing queue 492 will receive the print job ticket 303 is generally made by comparing the capabilities (e.g., speed, volume capacity, cost per page, color printing and the like) of the various printers 116 associated with the set of printing queues 492 determined from the virtual printer name or ID and the content of the print job ticket 303. Present work load of each printer 116 may also be taken into consideration when directing print job tickets 303 to a printing queue 492. The print queue logic 196 examines the print job ticket 303 to determine the nature (e.g., size, content, etc) and/or source of the print job (e.g., client 106, user ID, group ID, etc). Depending on criteria established by the programming of the print queue logic 196 and/or by a printing network 490 administrator, the print queue logic 196 will assign the print job ticket 303 to an appropriate printing queue 492. For instance, the queue server 109 will direct print job tickets 303 to a printer 119 located in close physical proximity to the client 106 or designated for the user ID or group ID contained in the print job ticket 303. In another example, the queue server 109 will direct print job tickets 303 specifying that the associated full print job 313 contains color images to a printing queue 492 associated with a color printer 119. Alternatively, the queue server 109 can split the print job ticket among multiple print queues 492 to distribute voluminous jobs among several printers 119 and/or direct pages having color to a color printer and black and white pages to a monochromatic printer. Once assigned to a printing queue 492, the print job ticket 303 will be prioritized with previously received print job tickets 303 as described above.

Figure 7:
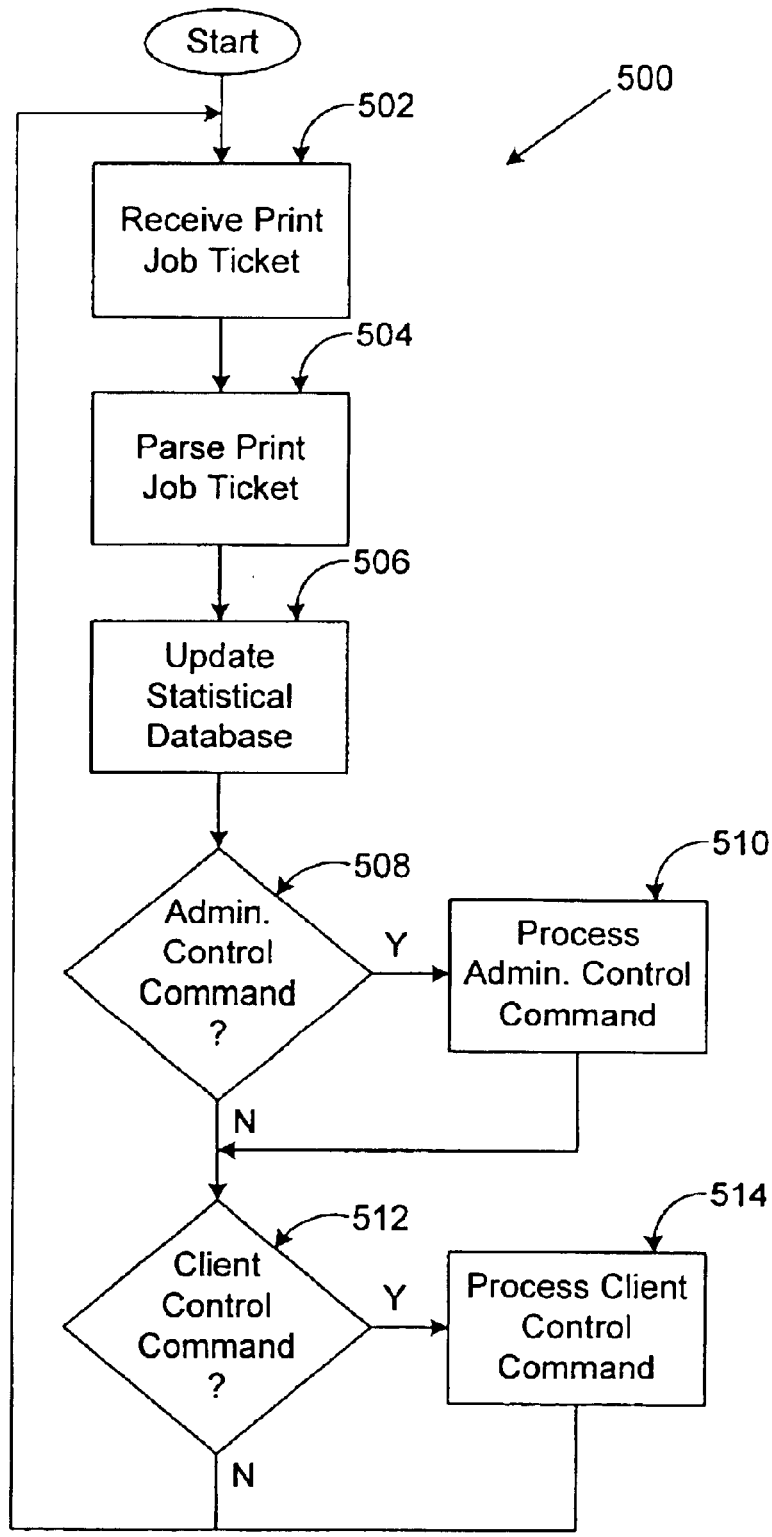
FIG. 7 is a flow chart of a print job ticket processing logic executed by a queue server in the network of FIG. 6 to implement of the printing protocol of FIG. 2.

Turning now to FIGS. 6 and 7, the print job ticket processing logic 500 will be described in greater detail. Starting at block 502, the print job ticket processing logic 500 receives a print job ticket 303. Next, the print job ticket 303 is parsed, or decoded, in block 504 to determine the content of the print job ticket 303. As is known in the art, the print job ticket 303 can contain a plurality of fields. Each field respectively contains data readable by the queue server 109. The data can be in a suitable format, such as extensible markup language (XML) or simply a binary word that represents an item of information related to the print job. The print job ticket processing logic 500 is programmed to identify the data contained in each.

As mentioned above, the content of the print job ticket 303 includes client information and print job information. This information is shared with the print queue logic 196 to carryout the processing, including queue assignment and prioritization, discussed in more detail with respect to FIG. 3. In addition, the information is used to complete the logic routine for the print job ticket processing logic 500 described below.

After the print job ticket 303 is parsed in block 504, a statistical database 494 (FIG. 6) is updated in step 506. The statistical database 494 may be stored as part of the memory 176 of the queue server 109 or contained in a separate memory resident in the queue server 109. Alternatively, the statistical database 494 can be stored remotely and shared among multiple queue servers. The statistical database 494 is used to track information useful to the printing network 490 administrator. The information contained in the statistical database 494 can be used to bill users or departments for supplies and/or to prepare audit and usage logs. Information contained in the print job ticket 303, such as the user's department, a job charge number, number of pages, job content and the like, can be used to derive a monetary value for the print job and route a bill to an appropriate recipient. Bills can be generated on paper or electronically by the queue server 109. In addition, a bill can be generated for each print job ticket 303 received or on a periodic basis to consolidate the billing of multiple print job tickets 303. Audit and usage logs can be maintained to keep track of printer usage, schedule periodic maintenance, predict when supplies (e.g., toner and paper) may require replacement and the like.

Using a graphical user interface provided by the print job ticket processing logic 500, the printing network 490 administrator can establish and maintain a suitable statistical database 494 for the printing network 490. Generally, as the number of items of information contained in the print job ticket 303 increases, the printing network 490 administrator can construct a more detailed statistical database 494. The resulting bills and logs will also be more detailed.

After the statistical database 494 is updated in block 506, the print job ticket processing logic 500 proceeds to block 508 where the queue server 109 determines if a printing network 490 administrator command has been received by the queue server 109. The administrator commands are intended to provide centralized control of printing network 490 functions and include, but are not limited to, canceling a print job, reprioritizing print jobs within one or more printing queues 492, moving a print job from one printing queue 492 to another printing queue 492, pausing one or more print job, pausing one or more printer 116 and determining the status of a print job. At least two methods of entering printing network 490 administrator commands are contemplated. The first is a command entered by the administrator using an input device associated with the printing network 490. The second is a predetermined command stored in the queue server 109 to be executed when a print job ticket 303 containing a predetermined item of information is received.

If an administrator command has been received in block 508, the print job ticket processing logic 500 proceeds to block 510 where the command is associated with the appropriate print job ticket 303 and executed to carry out the specified control function. Thereafter, the print job ticket processing logic 500 progresses to block 512. If no administrator command has been received in block 508, the print job ticket processing logic 500 proceeds directly to block 512.

In block 512, the print job ticket processing logic 500 determines whether a client control command has been received. Client control commands are usually entered at the client 106 using an input device and are assisted by a graphical user interface. Once entered, the client command is sent from the client 106 to the queue server 109. Client control commands are intended to provide the user with certain control privileges over the print job tickets 303 and associated print jobs generated by the client 109 and include, but are not limited to, canceling a print job and pausing a print job. If a client control command has been received in block 512, the print job ticket processing logic 500 proceeds to block 514 where the command is associated with the appropriate print job ticket 303 and executed to carry out the specified control function. Thereafter, the print job ticket processing logic 500 progresses back to block 502. If no client control command has been received in block 512, the print job ticket processing logic 500 proceeds directly back to block 502.

Although the logic 159 (FIG. 1), 196 (FIG. 1), 236 (FIG. 1) and 500 (FIG. 6) of the present invention is embodied in software as discussed above, as an alternative the logic 159, 196, 236 and 500 may also be embodied in hardware or a combination of software and hardware. If embodied in hardware, the logic 159, 196, 236 and 500 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 3–5 and 7 show the architecture, functionality, and operation of an implementation of the logic 159, 196, 236 and 500. If embodied in software, each block may represent a module, segment, or portion of code that comprises one or more executable instructions to implement the specified logical function(s). If embodied in hardware, each block may represent a circuit or a number of interconnected circuits to implement the specified logical function(s). Although the flow charts of FIGS. 3–5 and 7 show a specific order of execution, it is understood that the order of execution may differ from that which is depicted. For example, the order of execution of two or more blocks may be altered relative to the order shown. Also, two or more blocks shown in succession in FIGS. 3–5 and 7 may be executed concurrently or with partial concurrence. It is understood that all such variations are within the scope of the present invention.

Also, the logic 159, 196, 236 and 500 can be embodied in any computer-readable medium for use by or in connection with an instruction execution system such as a computer/processor based system or other system that can fetch or obtain the logic from the computer-readable medium and execute the instructions contained therein. In the context of this document, a "computer-readable medium" can be any medium that can contain, store, or maintain the logic 159, 196, 236 and 500 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Many variations and modifications may be made to the above-described embodiment(s) of the invention without departing substantially from the spirit and principles of the invention. All such modifications and variations are intended to be included herein within the scope of the present invention.

What is claimed is:

1. A system in a queue server for controlling the printing of a document, comprising:
   a processor coupled to a local interface;
   a memory coupled to the local interface; and
   print queue logic stored in the memory and executable by the processor, the print queue logic including:
   logic to place a print job ticket received from a client over a network in a printing queue, the printing queue determined by information contained in the print job ticket;
   logic to determine if a printer associated with the printing queue is available to print the document, wherein the document remains stored in the client; and
   logic to transmit the print job ticket to a print server associated with the printer if the printer is available to print the document, wherein the print job ticket identifies the address of the client on a network.

2. The system according to claim 1, wherein the printing queue is selected by the queue server from a plurality of printing queues, each of the plurality of printing queues logically associated with a print server and a corresponding printer.

3. The system according to claim 2, wherein the print job ticket is prioritized among previously received print job tickets based on information contained in the print job ticket.

4. The system according to claim 1, wherein the client generating the print job ticket specifies a destination printer and the queue server places the print job ticket in the printing queue associated with the specified destination printer.

5. The system according to claim 4, wherein the print job ticket is prioritized among previously received print job tickets based on information contained in the print job ticket.

6. The system according to claim 1, wherein the information contained in the print job ticket is at least one type of information selected from a client ID, a user ID, a group ID, a destination printer, a document size, a document content, a billing information, or a combination thereof.

7. A method in a queue server for controlling a printing of a document, comprising the steps of:
   receiving a print job ticket in the queue server from a client over a network, wherein the document associated with the print lob ticket remains stored in the client;
   placing the print job ticket in a printing queue, the printing queue determined by information contained in the print job ticket;
   determining if a printer associated with the printing queue is available to print the document; and transmitting the print job ticket to a print server associated with the printer if the printer is available to print the document, wherein the print job ticket identifies the address of the client on a network.

8. The method according to claim 7, further comprising the step of selecting the printing queue from a plurality of printing queues, each of the plurality of printing queues logically associated with a print server and a corresponding printer.

9. The method according to claim 7, wherein the print job ticket specifies the printer and the queue server places the print job ticket in the printing queue associated with the specified destination printer.

10. The method according to claim 7, further comprising the step of prioritizing the print job ticket among previously received print job tickets based on information contained in the print job ticket.

11. The method according to claim 7, further comprising the steps of:

parsing the print job ticket; and updating a statistical database with information contained in the print job ticket.

12. The method according to claim 11, further comprising the step of generating a bill from the content of the statistical database.

13. The method according to claim 11, further comprising the step of generating a log of printing activity from the content of the statistical database.

14. The method according to claim 7, further comprising the step of responding to a printing network administrator control command or a client control command.

\* \* \* \* \*